US009558330B2

(12) United States Patent
Pogorelik et al.

(10) Patent No.: US 9,558,330 B2
(45) Date of Patent: Jan. 31, 2017

(54) TECHNOLOGIES FOR DIGITAL RIGHTS MANAGMENT OF 3D PRINTABLE MODELS

(71) Applicant: Intel Corporation, Santa Clara, CA (US)

(72) Inventors: Oleg Pogorelik, Lapid (IL); Ned M. Smith, Beaverton, OR (US); Alex Nayshtut, Gan Yavne (IL); Avishay Sharaga, Bet Nehemya (IL)

(73) Assignee: Intel Corporation, Santa Clara, CA (US)

( * ) Notice: Subject to any disclaimer, the term of this patent is extended or adjusted under 35 U.S.C. 154(b) by 22 days.

(21) Appl. No.: 14/580,772

(22) Filed: Dec. 23, 2014

(65) Prior Publication Data
US 2016/0180061 A1 Jun. 23, 2016

(51) Int. Cl.
| G06F 21/10 | (2013.01) |
| G06F 21/62 | (2013.01) |
| G06F 21/71 | (2013.01) |
| G06F 21/30 | (2013.01) |
| B29C 67/00 | (2006.01) |
| G05B 19/4099 | (2006.01) |
| H04L 29/06 | (2006.01) |
| B33Y 50/02 | (2015.01) |

(52) U.S. Cl.
CPC ........... *G06F 21/10* (2013.01); *B29C 67/0088* (2013.01); *G05B 19/4099* (2013.01); *G06F 21/30* (2013.01); *G06F 21/6209* (2013.01); *G06F 21/71* (2013.01); *H04L 63/0428* (2013.01); *H04L 63/102* (2013.01); *B33Y 50/02* (2014.12); *G05B 2219/35134* (2013.01); *G05B 2219/49007* (2013.01); *G06F 2221/0768* (2013.01); *H04L 63/061* (2013.01)

(58) Field of Classification Search
CPC ...... G06F 21/10; G06F 21/30; G06F 21/6209; G06F 21/71; B29C 67/0088; G05B 19/4099; H04L 63/20; B33Y 50/02
USPC ........................................................ 713/189
See application file for complete search history.

(56) References Cited

U.S. PATENT DOCUMENTS

| 2014/0058959 A1* | 2/2014 | Isbjornssund ........... G06F 21/10 705/310 |
| 2014/0122579 A1* | 5/2014 | Friefeld .................. H04L 67/06 709/203 |
| 2014/0283104 A1* | 9/2014 | Nilsson ................... G06F 21/10 726/26 |

(Continued)

Primary Examiner — Michael S McNally
(74) Attorney, Agent, or Firm — Barnes & Thornburg LLP

(57) ABSTRACT

Technologies for 3D printing digital rights management (DRM) include a 3D printing device communicatively coupled with a 3D model storage server and a rights management server over a network. The 3D printing device may establish a model unlock engine in a first trusted execution environment and a key release engine in a second trusted execution environment. The model unlock engine may extract a content access policy and a content key from an encrypted 3D model and generate a content key request to the key release engine. The key release engine may validate the content key request and decrypt the content key in response to the content access policy being satisfied. The model unlock engine may further decrypt 3D model content included in the 3D model using the decrypted content key to facilitate the printing of the 3D model.

24 Claims, 6 Drawing Sheets

(56) References Cited

U.S. PATENT DOCUMENTS

| | | | |
|---|---|---|---|
| 2015/0026785 A1* | 1/2015 | Soon-Shiong | G06Q 30/0207 726/7 |
| 2015/0120806 A1* | 4/2015 | Lippincott | H04L 67/10 709/203 |
| 2015/0134955 A1* | 5/2015 | Lacaze | H04L 9/0877 713/168 |
| 2015/0332058 A1* | 11/2015 | Chen | G06F 21/602 713/193 |

* cited by examiner

TECHNOLOGIES FOR DIGITAL RIGHTS MANAGMENT OF 3D PRINTABLE MODELS

BACKGROUND

Additive manufacturing, or 3D printing as it is commonly referred to, is a process of "printing" a physical 3D object using additive processes. In additive processes, a series of thin, successive layers of material are placed under the control of a computing device (i.e., a 3D printer). A variety of technologies exist for 3D printing, mainly differing in materials used to create the object, and how the layers are placed and/or fused. Similar to traditional printing, the 3D printer receives a digital representation, or 3D model, which serves as a blueprint for the 3D printer to use in executing the printing operation. Upon receiving the 3D model, the 3D printer analyzes the 3D model and uses printer nozzles to deposit the material, typically in a series of cross-sections, forming the layers based on the 3D model.

The 3D model may be created using computer aided design (CAD) modelling software or by scanning a real-world object using a 3D scanner. Presently, the 3D models are sold as digital files from which a purchaser can then create an unlimited number of copies. To limit the number of copies, sellers may require a key to unlock the content. However, such methods do not prevent the sharing of keys, nor does the key typically limit the number of copies that may be created using the key. Additionally, 3D printers are often based on open sourced designs, which may allow for modification to circumvent the required keys. For example, a digital rights (DRM) key protected 3D model may be compromised (i.e., left unprotected) between the point at which the DRM key was used to remove protection from the 3D model and the point in which the unprotected content is used by the 3D printer for printing. During such time, the unprotected content is vulnerable to be copied and redistributed without requiring a DRM key.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
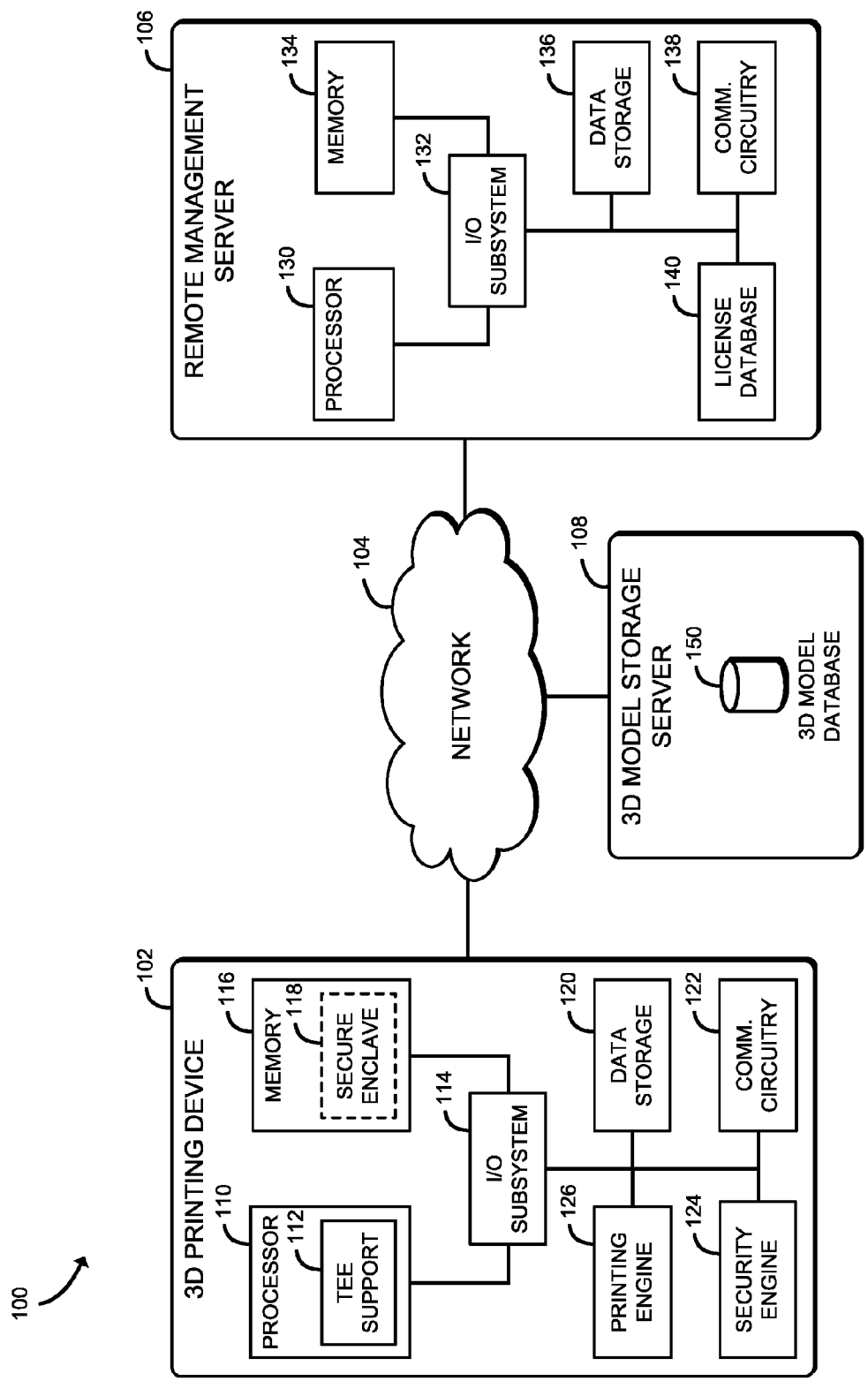
FIG. 1 is a simplified block diagram of at least one embodiment of a system for digital rights managed (DRM) 3D printing.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for digital rights managed (DRM) 3D printing includes a 3D printing device 102 in communication with a 3D model storage server 108 and a rights management server 106 over a network 104. In use, as described in more detail below, in some embodiments a 3D model package may be loaded for printing to the 3D printing device 102, such as by retrieving a 3D model package from the 3D model storage server 108. The 3D model package may be embodied as a secure package including content of a 3D model encrypted by a content key at the 3D model storage server 108. In some embodiments, the 3D model package may be stored in a 3D model database 150 of the 3D model storage server 108 that is embodied as a secured database. The 3D printing device 102 analyzes the 3D model package to determine whether content of the 3D model package is authorized to be printed by the 3D printing device 102. To do so, the 3D printing device 102 performs a verification operation on a license and/or a content access policy stored in the 3D model package. The verification operation ensures that the 3D model printed using the 3D model packet is manufactured according to the specifications (i.e., the content of the 3D model may not be manipulated) and that unlicensed copies are not being printed.

In some embodiments, the verification operations may be offloaded, or performed by sending extracted information (e.g., the content access policy, the license, etc.) from the 3D model package to a remote computing device to perform the verification operations, such as the rights management server 106. If the authorization was successful, the rights management server 106 notifies the 3D printing device 102, which then removes the DRM from the content of the 3D model package and performs the printing of the 3D model loaded for printing. If not, the rights management server 106 may notify the user that the 3D model loaded for printing is not authorized. Additionally, the rights management server 106 may provide the user with a means to obtain (i.e., purchase) a license that will authorize the printing of the loaded 3D model.

Additionally or alternatively, in use, as described in more detail below, in some embodiments the 3D printing device 102 may establish a trusted execution environment and perform the 3D model information extraction and DRM removal from within the trusted execution environment. In some embodiments, the 3D printing device 102 may additionally or alternatively send the print commands from within the trusted execution environment. Thus, the 3D printing device 102 may not expose unsecured data outside of the trusted execution environment. As such, the unencrypted content of the 3D model may not be shared and the number of copies remains limited to the conditions of the access policy and/or license associated with the user and the 3D model.

The 3D printing device 102 may be embodied as any type of computing device capable of performing the functions described herein, including, without limitation, a stereolithography 3D printing device, a fused deposition modeling 3D printing device, a selective laser sintering 3D printing device, a selective laser melting 3D printing device, an electronic beam melting 3D printing device, a laminated object manufacturing, and/or any other 3D printing device technology. As shown in FIG. 1, the 3D printing device 102 illustratively includes a processor 110, an input/output subsystem 114, a memory 116, a data storage device 120, communication circuitry 122, a security engine 124, and a printing engine 126. Of course, in other embodiments, the 3D printing device 102 may include other or additional components, such as those commonly found in a 3D printing device. Additionally, in some embodiments, one or more of the illustrative components may be incorporated in, or otherwise form a portion of, another component. For example, the memory 116, or portions thereof, may be incorporated in one or more processors 110, in some embodiments.

The processor 110 may be embodied as any type of processor capable of performing the functions described herein. The processor 110 may be embodied as a single or multi-core processor(s), digital signal processor, microcontroller, or other processor or processing/controlling circuit. The processor 110 includes trusted execution environment (TEE) support 112. The TEE support 112 allows the processor 110 to establish a software execution environment in which executing code may be measured, verified, or otherwise determined to be authentic. Additionally, code and data included in the software TEE may be encrypted or otherwise protected from being accessed by code executing outside of the software TEE. In some embodiments, the TEE support 112 may be embodied as Intel® Software Guard Extensions (SGX) technology. Intel® SGX technology may be embodied as a set of processor instruction extensions that allow the processor 110 to establish one or more secure enclaves 118 in the memory 116, which may be embodied as regions of memory including software that is isolated from other software executed by the processor 110.

The memory 116 may be embodied as any type of volatile or non-volatile memory or data storage capable of performing the functions described herein. In operation, the memory 116 may store various data and software used during operation of the 3D printing device 102 such as operating systems, applications, programs, libraries, and drivers. The memory 116 may include one or more secure enclaves 118 (i.e., software isolation trusted execution environments (TEEs)). Each secure enclave 118 may be embodied as a protected region of the memory 116. Each secure enclave 118 may include code and data that is measured, validated, or otherwise authenticated. Additionally, the contents of the secure enclave 118 may be protected from access by software executing outside of the same secure enclave 118. The contents of each secure enclave 118 may be protected from access and/or tampering using any combination of hardware protection and/or cryptographic protection. For example, each secure enclave 118 may be embodied as a secure enclave created and otherwise managed using Intel® SGX technology. In some embodiments, a part or the entire secure enclave 118 may be stored in a specialized memory structure such as an enclave page cache (EPC).

The memory 116 is communicatively coupled to the processor 110 via the I/O subsystem 114, which may be embodied as circuitry and/or components to facilitate input/output operations with the processor 110, the memory 116, and other components of the 3D printing device 102. For example, the I/O subsystem 114 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 114 may form a portion of a system-on-a-chip (SoC) and be incorporated, along with the processors 110, the memory 116, and other components of the 3D printing device 102, on a single integrated circuit chip.

The data storage device 120 may be embodied as any type of device or devices configured for short-term or long-term storage of data such as, for example, memory devices and circuits, memory cards, hard disk drives, solid-state drives, or other data storage devices. The data storage device 120 may be used to temporarily or permanently store securely packaged content. In some embodiments, the data storage device 120 may be used to store the contents of one or more secure enclaves 118. When stored by the data storage device 120, the contents of the secure enclaves 118 may be encrypted to prevent access by unauthorized software.

The communication circuitry 122 of the 3D printing device 102 may be embodied as any communication circuit, device, or collection thereof, capable of enabling communications between the 3D printing device 102, the 3D model storage server 108 and the rights management server 106, and/or other network devices (not shown) over the network 104. The communication circuitry 122 may be configured to use any one or more communication technology (e.g., wired or wireless communications) and associated protocols (e.g., Ethernet, Bluetooth®, Wi-Fi®, WiMAX, etc.) to affect such communication.

The security engine 124 may be embodied as any hardware component(s) or circuitry capable of establishing a trusted execution environment (TEE) on the 3D printing device 102. In particular, the security engine 124 may support executing code and/or accessing data that is independent and secure from other code executed by the 3D printing device 102. The security engine 124 may be embodied as a Trusted Platform Module (TPM), a manageability engine (ME), an out-of-band processor, or other security engine device or collection of devices. In some embodiments the security engine 124 may be embodied as a converged security and manageability engine (CSME) incorporated in a system-on-a-chip (SoC) of the 3D printing device 102. Further, in some embodiments, the security engine 124 is also capable of communicating using the communication circuitry 122 or a dedicated communication circuit independently of the state of the 3D printing device 102 (e.g., independently of the state of the main processor 110), also known as "out-of-band" communication.

The printing engine 126 may be embodied as any hardware component(s) or circuitry capable of translating print commands (i.e., print control signals) and performing the 3D printing. In particular, the printing engine 126 may directly control the material layering by the printer nozzles of the 3D printing device 102. The printing engine 126 may be based on the type of technology the 3D printing device 102 uses to print a 3D model, such as stereolithography, fused deposition modeling, selective laser sintering, selective laser melting, electronic beam melting, laminated object manufacturing, and/or any other type of 3D printing technology.

As discussed in more detail below, the 3D printing device 102, the 3D model storage server 108, and the rights management server 106 may be configured to transmit and receive data with each other and/or other devices of the system 100 over the network 104. The network 104 may be embodied as any number of various wired and/or wireless networks. For example, the network 104 may be embodied as, or otherwise include, a wired or wireless local area network (LAN), a wired or wireless wide area network (WAN), a cellular network, and/or a publicly-accessible, global network such as the Internet. As such, the network 104 may include any number of additional devices, such as additional computers, routers, and switches, to facilitate communications among the devices of the system 100.

The rights management server 106 may be embodied as any type of computation or computer device capable of performing the functions described herein, including, without limitation, a computer, a multiprocessor system, a server, a rack-mounted server, a blade server, a laptop computer, a notebook computer, a tablet computer, a wearable computing device, a network appliance, a web appliance, a distributed computing system, a processor-based system, and/or a consumer electronic device. Similar to the 3D printing device 102, the illustrative rights management server 106 includes a processor 130, an I/O subsystem 132, a memory 134, a data storage device 136, and a communication circuitry 138. As such, further descriptions of the like components are not repeated herein for clarity of the description with the understanding that the description of the corresponding components provided above in regard to the 3D printing device 102 applies equally to the corresponding components of the rights management server 106. The illustrative rights management server 106 additionally includes a license database 140. In some embodiments, the license database 140 may be stored in a secure portion of the rights management server 106.

Additionally, in some embodiments, the rights management server 106 may be embodied as a "virtual server" formed from multiple computing devices distributed across the network 104 and operating in a public or private cloud. Accordingly, although the rights management server 106 is illustrated in FIG. 1 as embodied as a single server computing device, it should be appreciated that the rights management server 106 may be embodied as multiple devices cooperating together to facilitate the functionality described below.

The rights management server 106 is configured to verify whether a 3D model requested for printing by the 3D printing device 102 is authorized to be printed. For example, the rights management server 106 may receive a decrypted content access policy from the 3D printing device 102 to determine whether the content access policy meets the conditions corresponding to the 3D model and the purchaser of the license. In some embodiments, the content access policy may indicate to the rights management server 106 to only allow printing if one or more conditions of the content access policy. For example, the content access policy may require certain features and/or data associated with the 3D printing device 102 to be satisfied (e.g., a location, a network identifier, a serial number, etc.) and/or to check a number of copies purchased for use against a number of copies used (i.e., printed).

The 3D model storage server 108 may be embodied as any type of computation or computer device capable of performing the functions described herein, including, without limitation, a computer, a multiprocessor system, a server, a rack-mounted server, a blade server, a laptop computer, a notebook computer, a tablet computer, a wearable computing device, a network appliance, a web appliance, a distributed computing system, a processor-based system, and/or a consumer electronic device. The 3D model storage server 108 may include components and devices commonly found in a server or similar computing device, such as a processor, an I/O subsystem, a memory, a data storage device, communication circuitry, and/or other peripheral devices. Those individual components of the 3D model storage server 108 may be similar to the corresponding components of the rights management server 106, the description of which is applicable to the corresponding components of the 3D model storage server 108 and is not repeated herein so as not to obscure the present disclosure. Additionally, in some embodiments, the 3D model storage server 108 may be embodied as a "virtual server" formed from multiple computing devices distributed across the network 104 and operating in a public or private cloud. Accordingly, although the 3D model storage server 108 is illustrated in FIG. 1 as embodied as a single server computing device, it should be appreciated that the 3D model storage server 108 may be embodied as multiple devices cooperating together to facilitate the functionality described below.

The 3D model storage server 108 is configured to maintain a 3D model database 150 of secure 3D modeling data (i.e., encrypted 3D models) that may be used to provide printing instructions to the 3D printing device 102. The 3D model storage server 108 is further configured to receive uploaded, unsecured 3D models. In some embodiments, the 3D printing device 102 may receive the unprotected 3D models directly at the 3D printing device 102 or from an external device, such as, a personal computer, an external hard drive, etc. In some embodiments, the 3D model storage server 108 may be configured as a publicly available repository. In use, the 3D model storage server 108 encrypts the content of the unsecured 3D model using a content key before adding the 3D model database 150.

In some embodiments, the 3D model storage server 108 may be further configured to assign a license corresponding to the encrypted 3D model. The license may include unlock conditions and/or a maximum number of prints allowed for the encrypted 3D model before a purchase is required. For example, the license may not authorize any allowable prints, requiring copies to be purchased before the encrypted 3D model may be printed. The 3D model storage server 108 may be further configured to encrypt the content key and a content access policy with a license key specific to the 3D printing device 102 that resides in a secure portion of the 3D printing device 102. In some embodiments, the license key may be additionally or alternatively related to the purchaser of the license. The license key may be embodied as any encryption key that may be used to wrap, securely package, or otherwise encrypt data included in the 3D model package. For example, in some embodiments, the license key may be embodied as a symmetric key, a private key of an asymmetric key pair, a private Enhanced Privacy Identification (EPID) key, or any other appropriate encryption key.

The content access policy may include a set of rules indicating one or more conditions that must be satisfied before content of the 3D model may be accessed. In other words, the content of the 3D model may not be accessed without the content key and without the conditions of the content access policy having been met. For example, the conditions may include a location, a network identifier, and/or any other information related to the 3D computing device. In use, the 3D model storage server 108 may store a packaged 3D model (i.e., a 3D model package) that includes the encrypted content, the encrypted content access policy, the encrypted content key, and/or any other additional data of the 3D model package. In some embodiments, the encrypted policy may additionally include a digital signature to verify the authenticity of the encrypted policy.

Figure 2:
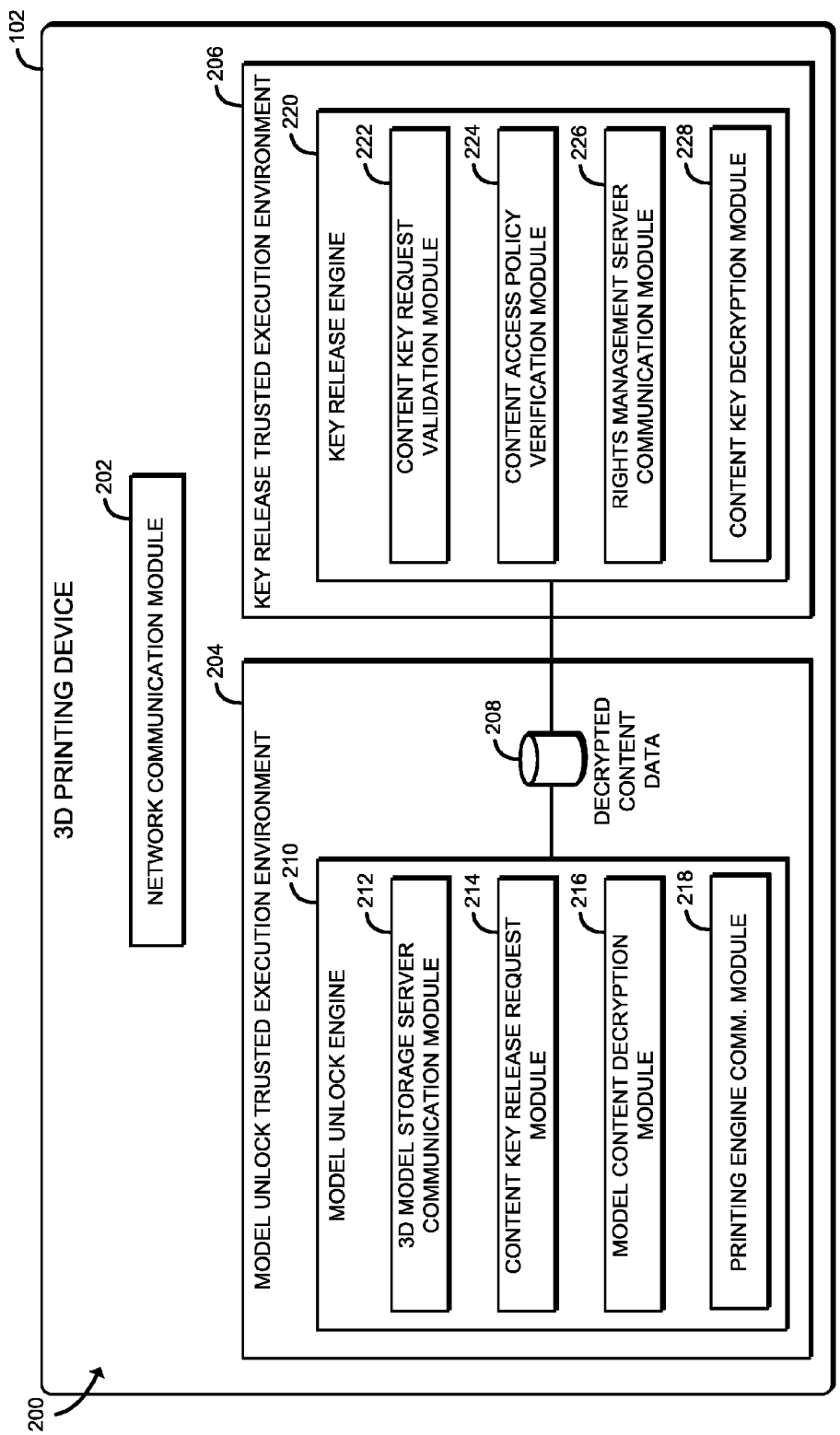
FIG. 2 is a simplified block diagram of at least one embodiment of an environment that may be established by a 3D printing device of FIG. 1.

Referring now to FIG. 2, in an illustrative embodiment, the 3D printing device 102 establishes an environment 200 during operation. The illustrative environment 200 includes a network communication module 202, a model unlock trusted execution environment (TEE) 204, and a key release trusted execution environment (TEE) 206. The illustrative model unlock TEE 204 includes a model unlock engine 210, and the illustrative key release TEE 206 includes a key release engine 220. The various modules and engines of the environment 200 may be embodied as hardware, firmware, software, or a combination thereof. For example, the various modules, logic, and other components of the environment 200 may form a portion of, or otherwise be established by, the processor 110 or other hardware components of the 3D printing device 102. As such, in some embodiments, any one or more of the modules of the environment 200 may be embodied as a circuit or collection of electrical devices (e.g., a network communication circuit, a model unlock detection circuit, a key release circuit, etc.).

The network communication module 202 is configured to facilitate incoming and outgoing network communications of the 3D printing device 102 over the network 104. For example, the network communication module 202 may facilitate the network communications between the 3D printing device and the rights management server 106 and/or the 3D model storage server. The network communication module 202 may facilitate the network communications over any number of various wired and/or wireless networks.

The model unlock TEE 204 is configured to provide an isolated and secure execution environment within the environment 200. In some embodiments, the model unlock TEE 204 may be embodied as a software-based trusted execution environment; that is, a trusted execution environment that securely executes software using the processor 110 of the 3D printing device 102. For example, the model unlock TEE 204 may be embodied as one or more secure enclaves established using the TEE support 112 of the processor 110, such as a secure enclave established using Intel® SGX technology.

The key release TEE 206 is configured to provide an isolated and secure execution environment within the environment 200. In some embodiments, the key release TEE 206 may be embodied as a hardware-based trusted execution environment; that is, a trusted execution environment that securely executes software independently of software executed by the processor 110. For example, the key release TEE 206 may be embodied using a coprocessor, out-of-band processor, or other component of the security engine 124.

Of course, in some embodiments, the model unlock TEE 204 may be embodied as a hardware-based trusted execution environment and/or the key release TEE 206 may be embodied as a software-based trusted execution environment. Additionally or alternatively, in some embodiments, a single trusted execution environment (not shown) may be configured to provide an isolated and secure execution environment within the environment 200 that includes each of the model unlock engine 210 and the key release engine 220. The illustrative model unlock TEE 204 additionally includes a decrypted content data 208, described in further detail below. In some embodiments, the decrypted content data 208 may additionally or alternatively be included in the key release TEE 206, the single trusted execution environment, or in an external, secure environment that may be accessed by the model unlock engine 210 and/or the key release engine 220 via a secure communication channel. Additionally or alternatively, in some embodiments, the 3D printing device 102 may include more than one decrypted content data 208. In such embodiments, each of the model unlock TEE 204 and the key release TEE 206 may include a decrypted content data 208.

The illustrative model unlock engine 210 includes a 3D model storage server communication module 212, a content key release request module 214, a model content decryption module 216, and a printing engine communication module 218. The 3D model storage server communication module 212 is configured to establish a secure connection with the 3D model storage server 108. The 3D model storage server communication module 212 may receive 3D models through the secure connection. In some embodiments, the 3D printing device 102 may be capable of receiving uploaded 3D models from a user or an externally connected device, such as a personal computer, or an external hard drive. In such embodiments, the 3D model storage server communication module 212 may transmit the uploaded 3D model to the 3D model storage server 108 through the secure connection.

The content key release request module 214 is configured to extract information from a 3D model and provide the extracted information to the key release engine 220 in the form of a request to release a content key (i.e., a content key release request) to use to decrypt the content of the 3D model. For example, the content key release request module 214 may be configured to extract an encrypted content access policy with signatures and a content key pack from the 3D model, which the content key release request module 214 may provide to the key release engine 220. In some embodiments, the content key release request module 214 may additionally provide a trusted execution environment proof of trust to the key release engine 220. The proof of trust may be embodied as any signature, measurement, key, token, or other data that may be used by the key release engine 220 to confirm that the model unlock TEE 204 has not been tampered with and/or the extracted information provided by the content key release request module 214 is authentic and has not been tampered with.

The model content decryption module 216 is configured to decrypt the content of the 3D model using the content key received from the key release engine 220. In some embodiments, the decrypted content may be stored in the decrypted content data 208 to keep the decrypted content secure. The printing engine communication module 218 is configured to send a sequence of print commands to the printing engine 126 based on the content (i.e., printing directions) of the 3D model. The printing engine communication module 218 is further configured to receive status updates from the printing engine 126, such as print command completion and/or printing complete commands Additionally, in some embodiments, the printing engine communication module 218 may send the sequence of print commands to the printing engine 126 and/or receive the status updates from the printing engine 126 over a secure communications channel.

The illustrative key release engine 220 includes a content key request validation module 222, a content access policy verification module 224, a rights management server communication module 226, and a content key decryption module 228. The content key request validation module 222 is configured to verify the validity of the content access policy signatures of the content key release request received from the model unlock engine 210. Additionally, the content key request validation module 222 may be configured to verify the validity of the proof of trust received from the model unlock engine 210. In some embodiments, if the policy signatures and/or proof of trust are determined to be invalid, the content key request validation module 222 may return a content key request error to the model unlock engine 210, which the 3D printing device 102 may use to notify a user of the 3D printing device 102 that the content key request error occurred.

The content access policy verification module 224 is configured to decrypt the content access policy using the content key pack received from the model unlock engine 210 and evaluate the decrypted content access policy. For example, the content access policy verification module 224 may decrypt the content access policy in response to a validation of the proof of trust and policy signatures by the content key request validation module 222. Thus, the content access policy verification module 224 may support making a policy determination on whether to allow the model unlock engine 210 to access the content (i.e., whether to release the content key to the model unlock engine 210). In such embodiments, the policy determination may be based on information specific to the 3D printing device 102, such as, a location, a network identifier (e.g., a media access control (MAC) address), a serial number of the 3D printing device 102. Alternatively, in some embodiments, at least a portion of the policy determination may not be made locally (i.e., may not be made at the 3D printing device 102). For example, the content access policy verification module 224 may decrypt the content access policy and provide the decrypted access policy to the rights management server communication module 226 for a policy determination to be made remotely at the rights management server 106.

The rights management server communication module 226 is configured to establish a secure connection with the rights management server 106. In some embodiments, the rights management server communication module 226 may transmit the decrypted access policy to the rights management server 106 through the secure connection. In such embodiments, the rights management server 106 may evaluate the decrypted content access policy and make the policy determination on whether to allow the model unlock engine 210 to access the content (i.e., whether to release the content key to the model unlock engine 210). The rights management server communication module 226 may receive the policy determination from the rights management server 106. The received policy determination may be provided to the content access policy verification module 224 to evaluate the policy determination. As such, the content access policy verification module 224, in response to a successful policy determination, may determine to release the content key to the model unlock engine 210. However, in some embodiments, in response to an unsuccessful policy determination, the content access policy verification module 224 may return an error indicating the content access policy verification failed. In such embodiments, the error may be provided to the model unlock engine 210, which the 3D printing device 102 may use to notify a user of the 3D printing device 102 that the content access policy verification failed.

The content key decryption module 228 is configured to decrypt and release the content key to the model unlock engine 210. For example, the content key decryption module 228 may decrypt and release the content key to the model unlock engine 210 in response to the content access policy verification module 224 determining that the content key may be released to the model unlock engine 210 (i.e., the policy determination was successfully validated).

In some embodiments, the key release engine 220 may receive a notification from the model unlock engine 210 that a printing of a 3D model has completed. In such embodiments, the rights management server communication module 226 may transmit the notification to the rights management server 106 through the secure connection. The rights management server 106 may then update a license corresponding to the 3D model (e.g., decrement a number of available copies maintained in the license).

Figure 3:
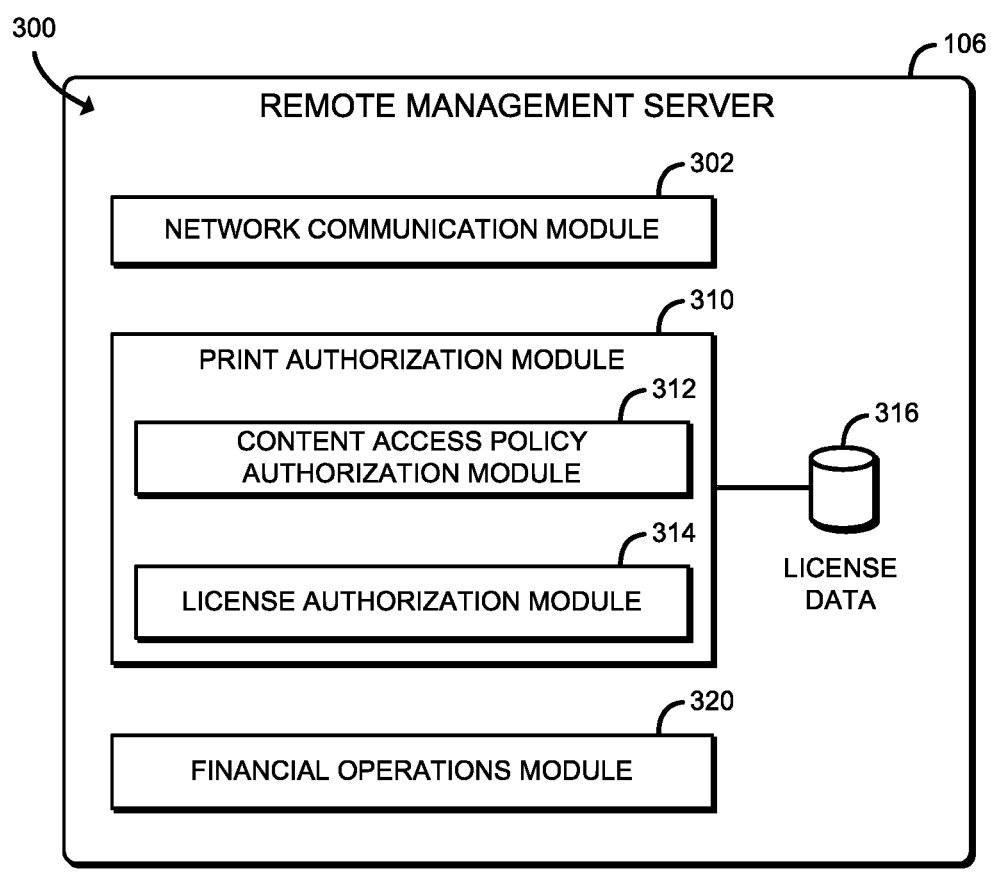
FIG. 3 is a simplified block diagram of at least one embodiment of an environment that may be established by a remote management server of FIG. 1.

Referring now to FIG. 3, in an illustrative embodiment, the rights management server 106 establishes an environment 300 during operation. The illustrative environment 300 includes a network communication module 302, a print authorization module 310, and a financial operations module 320. The various modules and engines of the environment 300 may be embodied as hardware, firmware, software, or a combination thereof. For example, the various modules, logic, and other components of the environment 300 may form a portion of, or otherwise be established by, the processor 130 or other hardware components of the rights management server 106. As such, in some embodiments, any one or more of the modules of the environment 200 may be embodied as a circuit or collection of electrical devices (e.g., a network communication circuit, a print authorization circuit, a financial operations circuit, etc.).

The network communication module 302 is configured to facilitate incoming and outgoing network communications of the rights management server 106 over the network 104.

For example, the network communication module 302 may facilitate the network communications between the rights management server 106 and the 3D printing device. The network communication module 302 may facilitate the network communications over any number of various wired and/or wireless networks. For example, in some embodiments, the network communication module 302 may be configured to receive a content access policy for a 3D model from the 3D printing device 102.

The print authorization module 310 is configured to verify whether a 3D model requested for printing by the 3D printing device 102 is authorized to be printed. In some embodiments, the print authorization module 310 includes a content access policy authorization module 312 and a license authorization module 314. The content access policy authorization module 312 is configured to provide an authorization indication to the 3D printing device 102, such as via the network communication module 302, in response to having determined whether one or more conditions of the received content access policy are met. For example, the rights management server 106 may to determine whether the content access policy meets the conditions corresponding to the 3D model. For example, the content access policy may require certain features and/or data associated with the 3D printing device 102 to be satisfied (e.g., a location, a network identifier, a serial number, etc.). The license authorization module 314 is configured to provide an authorization indication to the 3D printing device 102, such as via the network communication module 302, in response to having determined whether the requested 3D model for printing has a valid license at the rights management server 106. For example, a license may indicate a number of 3D model copies available for print for the 3D printing device 102, and upon receipt of the print request, the license authorization module 314 may provide an authorization determination based on whether the number of 3D model copies available for print is less than or equal to the number of copies requested for printing. In some embodiments, the license authorization module 314 may be configured to update the license information (i.e., a number of available prints of the 3D model). For example, the rights management server 106 may be configured to receive a notification from the 3D printing device 102 notifying that a print operation of the 3D model authorized for printing was successfully completed. In such an embodiment, the license may include a maximum allowable print count and a counter that may be incremented upon receipt of the notification of a successfully completed print. In some embodiments, a license corresponding to the 3D model and/or the 3D printing device 102 may be stored in a license data 316.

The financial operations module 320 is configured to facilitate financial operations (i.e., financial transactions). For example, the license authorization module 314 may determine the license corresponding to the 3D model requested for printing does not allow additional copies (i.e., the maximum number of allowable copies was reached). As such, the financial operations module 320 may provide an indication to the 3D printing device 102 to prompt the user to purchase additional copies in order to allow the print request, and perform any billing transactions associated therewith. Additionally, in some embodiments, the financial operations module 320 may facilitate subsequent financial transactions, such as credit card information processing, payment authorization, payment confirmation, etc.

Figure 4:
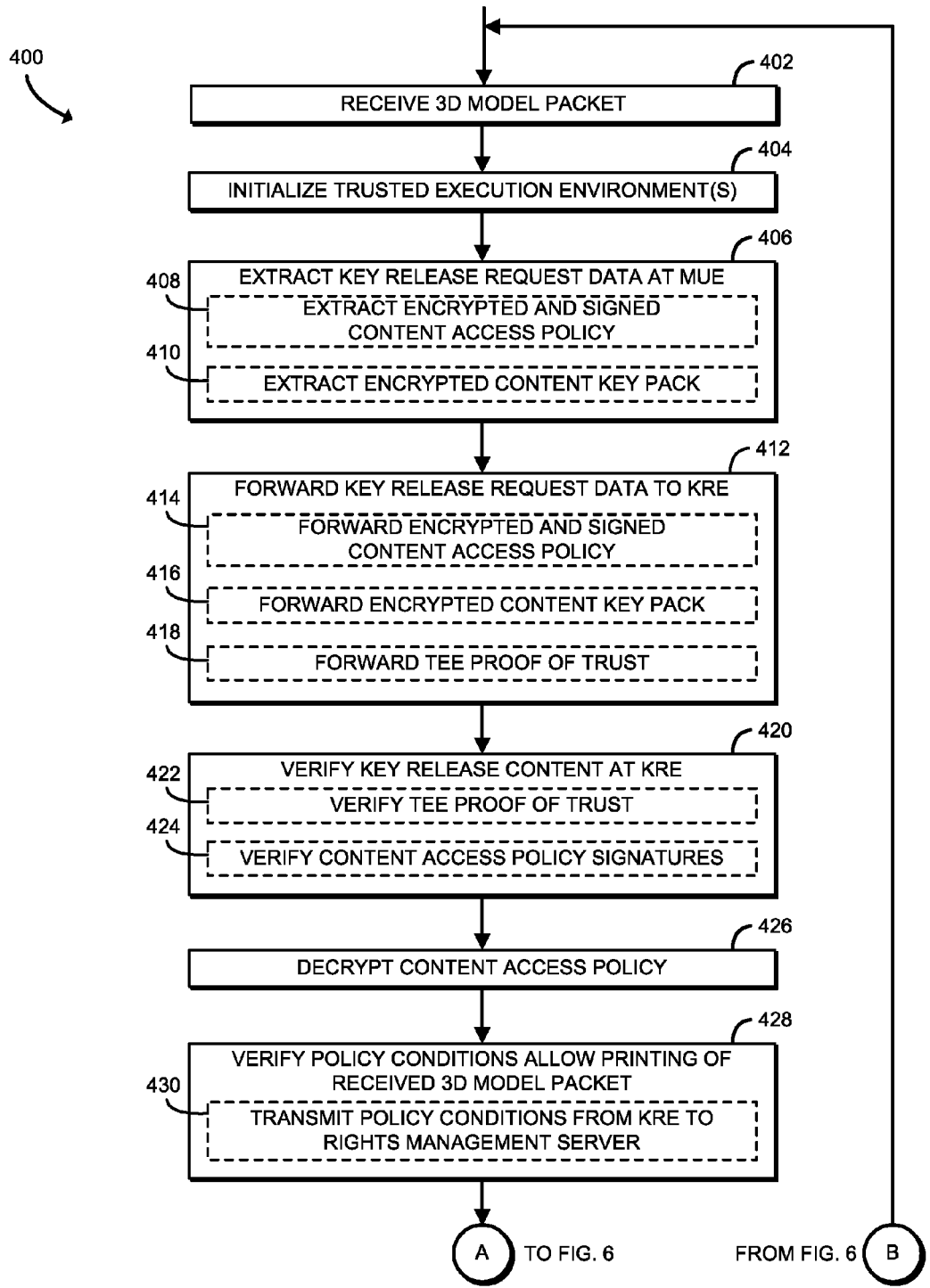
FIG. 4 is a simplified flow diagram of at least one embodiment of a method for requesting release of a content key from a 3D model package that may be executed by the 3D printing device of FIG. 2.

Referring now to FIG. 4, in use, the 3D printing device 102 may execute a method 400 for requesting release of a content key from a 3D model package. The method 400 begins with block 402, in which the 3D printing device 102 receives a 3D model package. For example, the 3D printing device 102 may receive a 3D model package from the 3D model storage server 108. As described above, the encrypted 3D model includes content encrypted using a content key, and a content access policy and a content key each encrypted using a license key specific to the 3D printing device 102. In some embodiments, the license key may be additionally or alternatively based on the purchaser of the license associated with the 3D model package. As described above, the license key may be embodied as any encryption key that may be used to wrap, securely package, or otherwise encrypt data included in the 3D model package. For example, the license key may be embodied as a symmetric key, a private key of an asymmetric key pair, a private Enhanced Privacy Identification (EPID) key, or any other appropriate encryption key.

The license key may be protected from unauthorized access by other components of the 3D printing device 102. For example, the license key may be stored in secure storage accessible only to the key release TEE 206. Continuing that example, in some embodiments, the license key may be stored in a protected hardware location such as flash memory accessible only to the security engine 124, or using a trusted platform module (TPM) of the 3D printing device 102. The 3D printing device 102 may initiate the content key release request process in response to a user command or other user input event. In some embodiments, the 3D printing device 102 may initiate the content key release request process in response to receiving the 3D model package from the 3D model storage server 108.

In block 404, the 3D printing device 102 may initialize one or more trusted execution environments. As described above, in some embodiments, the 3D printing device 102 may initialize the model unlock TEE 204 to create a secure environment for the model unlock engine 210 and the key release TEE 206 to create a secure environment for the key release engine 220, while in other embodiments a single TEE may be initialized to 204 to create a secure environment for the model unlock engine 210 and the key release engine 220. The 3D printing device 102 may perform any initialization procedures to allow the model unlock engine 210 and the key release engine 220 to be executed securely within a trusted execution environment. For example, the 3D printing device 102 may initialize a software isolation using the TEE support 112 of the processor 110, such as a secure enclave established using Intel® SGX technology. Additionally or alternatively, the 3D printing device 102 may initialize a hardware-based trusted execution environment that securely executes independently of software executed by the processor 110.

After initializing the trusted execution environments in block 404, execution of the method 400 proceeds with block 406 wherein the 3D printing device 102 extracts encrypted key release content, executed by the model unlock engine 210 from within the model unlock TEE 204 of the 3D printing device 102. For example, the 3D printing device 102 may transfer control to a secure enclave 118 that establishes the model unlock TEE 204. In some embodiments, the 3D printing device 102 may extract an encrypted and signed access control policy, in block 408, and/or extract an encrypted content key pack, in block 410.

In block 412, the model unlock engine 210, from within the model unlock TEE 204, forwards the extracted key release content from the model unlock engine 210 to the key release engine 220. In some embodiments, in block 414, the model unlock engine 210 may forward the encrypted and signed access control policy. Additionally, in some embodiments, in block 416, the model unlock engine 210 may forward the encrypted content key pack in block 416. Additionally or alternatively, in some embodiments, in block 418, the model unlock engine 210 may forward a model unlock TEE 204 proof of trust. The proof of trust may be embodied as any signature, measurement, key, token, or other data that may be used by the key release engine 220 to confirm that the model unlock TEE 204 has not been tampered with and/or the extracted information provided by the model unlock engine 210 is authentic and has not been tampered with.

After forwarding the extracted key release content from the model unlock engine 210, execution of the method 400 leaves the model unlock TEE 204 and proceeds with block 422 wherein the 3D printing device 102 verifies the key release content to determine whether to decrypt the content access policy, executed by the key release engine from within the key release TEE 206. In some embodiments, in block 424, the key release engine 220 may verify the model unlock TEE 204 proof of trust. In block 426, the key release engine 220, from within the key release TEE 206, decrypts the content access policy. In block 428, the key release engine 220, from within the key release TEE 206, verifies the policy conditions of the decrypted content access policy. For example, the key release engine 220 may determine whether information associated with the 3D printing device 102 matches the conditions defined in the content access policy. Additionally or alternatively, in some embodiments, the key release engine 220 may transmit the decrypted content access policy to the rights management server 106 using a secure communications channel in block 430.

Figure 5:
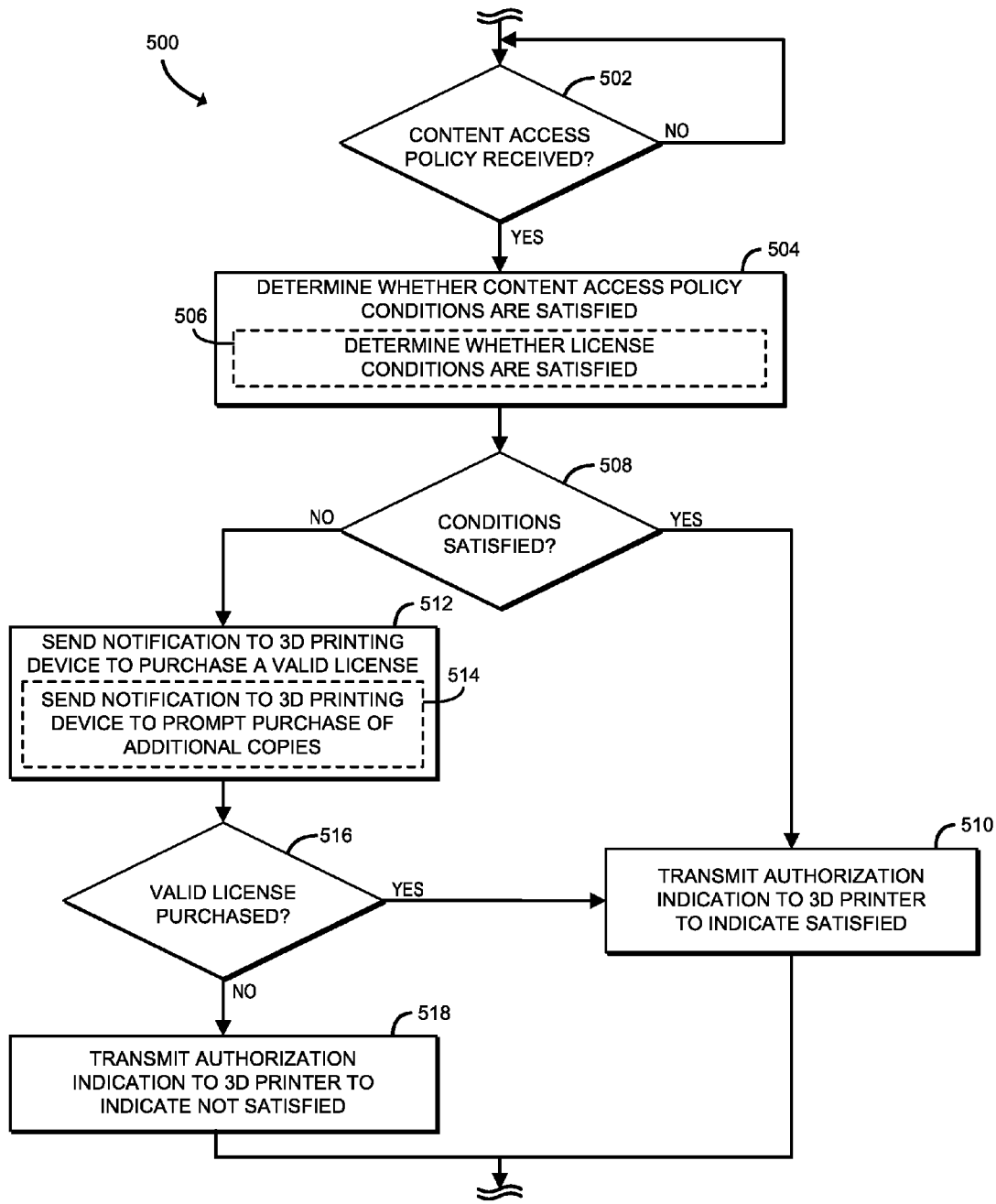
FIG. 5 is a simplified flow diagram of at least one embodiment of a method for determining an authorization indication of a content access policy of a 3D model package that may be executed by the rights management server of the system of FIG. 3.
Figure 6:
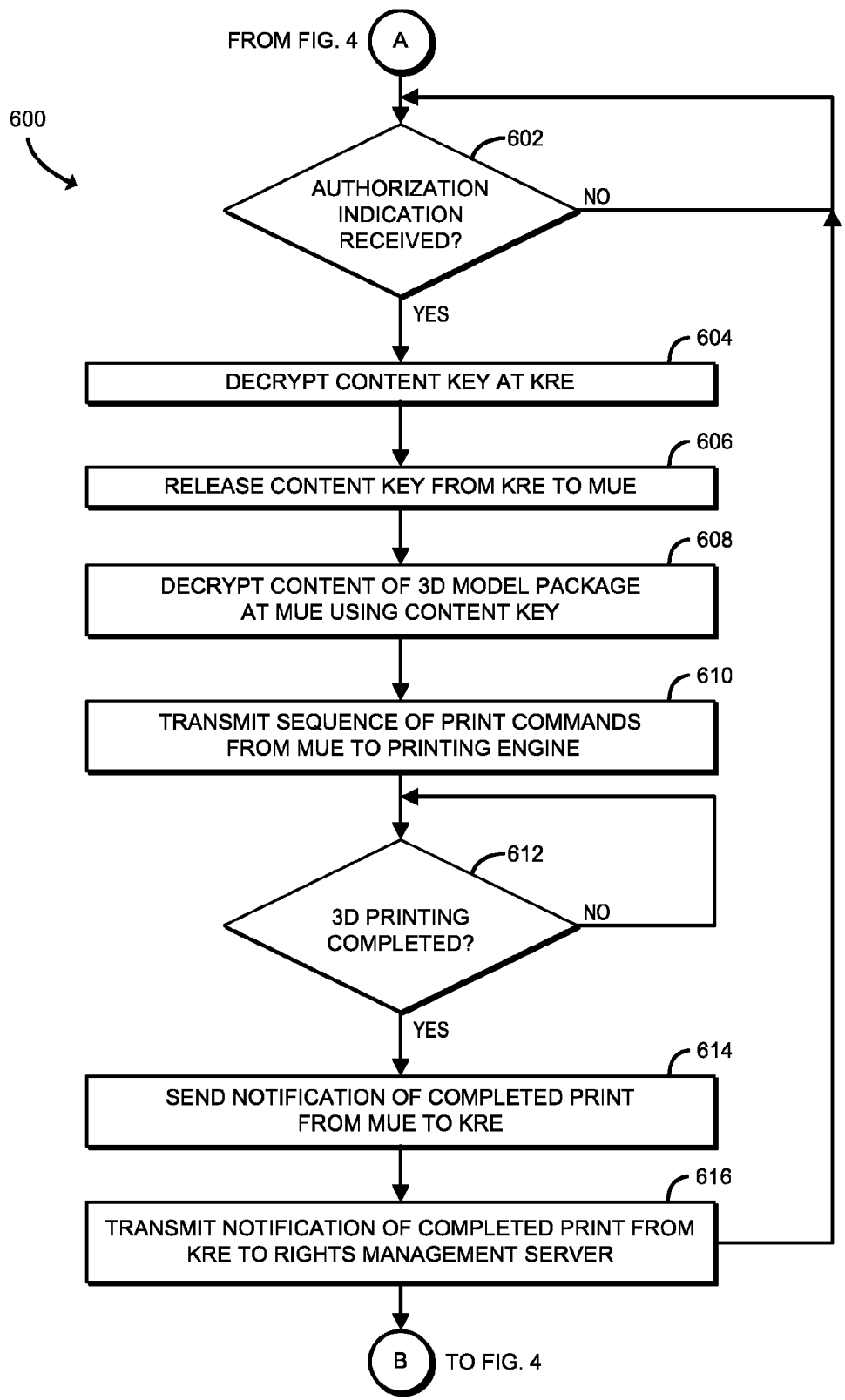
FIG. 6 is a simplified flow diagram of at least one embodiment of a method for printing content of a 3D model package that may be executed by the 3D printing device of FIG. 2.

In such embodiments, after transmitting the decrypted content access policy to the rights management server 106, the 3D printing device 102 may wait until an authorization indication is received from the rights management server 106, as shown in FIG. 6. Referring now to FIG. 5, in use, the rights management server 106 may execute a method 500 for determining an authorization indication of a content access policy of a 3D model package. The method 500 begins with block 502, in which the rights management server 106 determines whether the content access policy was received. If not, the method loops back to block 502 to continue to determine whether the content access policy was received. If the content access policy was received, the rights management server 106 determines whether conditions of the content access policy can be authorized in block 504. In some embodiments, the conditions of the content access policy used to determine whether conditions of the content access policy can be authorized in block 504 may be different conditions than those applied in block 428 of FIG. 4. Additionally or alternatively, in some embodiments, in block 506, the rights management server 106 may determine whether conditions of the license are satisfied. For example, the rights management server 106 may determine whether the requested number of copies is greater than an allowable number of copies stored in the license. In such embodiments, a license may be stored on the rights management server 106 indicating the allowable number of copies to compare against the requested number of copies.

In block 508, the rights management server 106 determines whether the conditions are satisfied (i.e., whether the 3D print request is authorized). For example, the rights management server 106 may determine whether of the conditions of the content access policy and/or the license are satisfied. If the rights management server 106 determines the content access policy conditions and/or the license conditions are satisfied, the method 500 advances to block 510, wherein the rights management server 106 transmits an authorization indication to the 3D printer that indicates the content access policy conditions and/or the license conditions are satisfied (i.e., the 3D print request is authorized). If not, the method 500 advances to block 512, wherein the rights management server 106 sends a notification to the 3D printing device 102 to indicate to a user of the 3D printing device 102 that a valid license is required to print the 3D model. In some embodiments, in block 514, the 3D printing device 102 may send a notification to the 3D printing device 102 to prompt the user to purchase additional copies for printing. In some embodiments, the rights management server 106 may facilitate a purchase transaction and update the license accordingly.

In block 516, the rights management server 106 determines whether a valid license was purchased. If a valid license was purchased, the method 500 advances to block 510 to transmit the authorization indication to the 3D printer indicating the content access policy conditions are satisfied (i.e., the 3D print request is authorized). If a valid license was not purchased, the method 500 advances to block 518, wherein the rights management server 106 transmits an authorization indication to the 3D printer that indicates the content access policy conditions are not satisfied (i.e., the 3D print request is not authorized).

Referring now to FIG. 6, in use, the 3D printing device 102 may execute a method 600 for printing content of a 3D model package. The method 600 begins with block 602, in which the 3D printing device 102 determines whether the authorization indication is received. If not, the method 600 loops back to block 602 to continue to determine whether the authorization indication is received. If the authorization indication is received, the method 600 continues to block 604, wherein the 3D printing device 102 decrypts the content key, executed by the key release engine 220 from within the key release TEE 206 of the 3D printing device 102.

In block 606, the key release engine 220, from within the key release TEE 206, releases the content key to the model unlock engine 210. In block 608, the 3D printing device 102 decrypts the content of the 3D model package, executed by the model unlock engine 210 from within the model unlock TEE 204 of the 3D printing device 102. In block 610, the model unlock engine 210, from within the model unlock TEE 204, transmits a sequence of print commands to the printing engine 126. In some embodiments, the sequence of print commands may be sent to the printing engine 126 using a secure communications channel.

In block 612, the model unlock engine 210, from within the model unlock TEE 204, determines whether the 3D printing has been completed. If not, the method 600 returns to block 612 to continue to determine whether the 3D print operation is completed. In some embodiments, the printing engine 126 may provide a notification to the model unlock engine 210 indicating the print operation has completed. If the model unlock engine 210 determines the 3D printing has been completed, the method 600 advances to block 614, wherein the model unlock engine 210, from within the model unlock TEE 204, sends a notification to the key release engine 220 that the print has completed. In block 616, the 3D printing device 102 transmits a notification that the print has successfully completed to the rights management server 106, executed by the key release engine 220 from within the key release TEE 206 of the 3D printing device 102. In some embodiments, the rights management server 106 may update a license (e.g., a number of copies used) on the server corresponding to the 3D model package and the purchaser that initiated the 3D model package print.

EXAMPLES

Illustrative examples of the technologies disclosed herein are provided below. An embodiment of the technologies may include any one or more, and any combination of, the examples described below.

Example 1 includes a 3D printing device for printing an encrypted 3D model, the 3D printing device comprising a network communication module to receive the encrypted 3D model, wherein the encrypted 3D model includes 3D model content, a content access policy, and a content key, wherein the 3D model content is encrypted by the content key and wherein each of the content access policy and the content key is encrypted by a license key; a model unlock engine to, within a first trusted execution environment, (i) extract the content access policy and the content key from the encrypted 3D model and (ii) generate a content key request, wherein the content key request includes the content access policy and the content key; a key release engine to, within a second trusted execution environment, (i) validate the content key request, (ii) decrypt the content access policy using the license key in response to a determination that the content key request is valid, (iii) decrypt the content key using the license key in response to a determination that conditions of the content access policy are satisfied, and (iv) provide the decrypted content key to the model unlock engine, wherein the model unlock engine is further to decrypt the 3D model content using the decrypted content key and provide a sequence of print commands to a printing engine of the 3D printing device based on the decrypted 3D model content.

Example 2 includes the subject matter of Example 1, and wherein the license key is protected by the second trusted execution environment.

Example 3 includes the subject matter of any of Examples 1 and 2, and further including a processor having trusted execution environment support, wherein the 3D printing device is to initialize the first trusted execution environment and the second trusted execution environment in response to receipt of the encrypted 3D model, and wherein to initialize the first trusted execution environment comprises to load a secure enclave using the trusted execution environment support of the processor.

Example 4 includes the subject matter of any of Examples 1-3, and wherein the model unlock engine is further to create a proof of trust of the first trusted execution environment, wherein the key release engine is further to receive the proof of trust of the first trusted execution environment and verify the proof of trust prior to the decryption of the content access policy.

Example 5 includes the subject matter of any of Examples 1-4, and further including a manageability engine to establish the second trusted execution environment.

Example 6 includes the subject matter of any of Examples 1-5, and further including a secure enclave to establish the first trusted execution environment; and a manageability engine to establish the second trusted execution environment.

Example 7 includes the subject matter of any of Examples 1-6, and wherein the content access policy defines conditions that must be satisfied prior to the decryption of the content key.

Example 8 includes the subject matter of any of Examples 1-7, and wherein the 3D model content further includes content access policy signatures, and the model unlock engine is to extract the content access policy signatures from the content access policy and generate a content key request that includes the content access policy, the content key, and the content access policy signatures, and the key release engine is to decrypt the content key using the license key in response to a determination that the content access policy signatures are valid and the conditions of the content access policy are satisfied.

Example 9 includes the subject matter of any of Examples 1-8, and wherein to receive the encrypted 3D model comprises to receive the encrypted 3D model from a 3D model storage server communicatively coupled to the 3D printing device.

Example 10 includes the subject matter of any of Examples 1-9, and wherein the key release engine is further to communicate with a rights management server communicatively coupled to the 3D printing device, and wherein to decrypt the content key using the license key in response to a determination that conditions of the content access policy are satisfied comprises to (i) transmit the content access policy to the rights management server, (ii) receive an authorization notification from the rights management server that indicates whether the conditions of the content access policy are satisfied, and (iii) decrypt the content key using the license key in response to an indication of the authorization notification that the conditions of the content access policy are satisfied.

Example 11 includes the subject matter of any of Examples 1-10, and wherein the key release engine is further to receive a notification that the print of the encrypted 3D model is completed from the model unlock engine and transmit a notification of print completion to the rights management server.

Example 12 includes the subject matter of any of Examples 1-11, and wherein the key release engine is not to decrypt the content key in response to an indication of the authorization notification that the conditions of the content access policy are not satisfied.

Example 13 includes the subject matter of any of Examples 1-12, and wherein the key release engine is to receive a notification for a user of the 3D printing device to purchase a license for the 3D model in response to a determination that the conditions of the content access policy are not satisfied.

Example 14 includes a rights management server for authorizing a print request from a 3D printing device, wherein the rights management server comprises a network communication module to receive a content access policy of a 3D model, wherein the content access policy defines one or more conditions of the content access policy required to authorize the print request; and a content access policy authorization module to verify the one or more conditions required to authorize the print request and transmit an authorization indication to the 3D printing device based on the verification of the one or more conditions of the content access policy required to authorize the print request.

Example 15 includes the subject matter of Example 14, and further including a license authorization module to verify one or more conditions of a license required to authorize the print request, wherein to transmit the authorization indication to the 3D printing device is further based on a verification of the one or more conditions of the license required to authorize the print request.

Example 16 includes the subject matter of any of Examples 14 and 15, and wherein to verify the one or more conditions of the license comprises to determine whether a number of allowable copies would be exceeded by an authorization of the print request.

Example 17 includes the subject matter of any of Examples 14-16, and further including a financial operations module to facilitate financial operations required to increase the number of allowable copies in response to a determination that the number of allowable copies would be exceeded by an authorization of the print request.

Example 18 includes a method for printing an encrypted 3D model, the method comprising receiving, by a 3D printing device, the encrypted 3D model, wherein the encrypted 3D model includes 3D model content, a content access policy, and a content key, wherein the 3D model content is encrypted by the content key and wherein each of the content access policy and the content key is encrypted by a license key; extracting, from within a first trusted execution environment of the 3D printing device, the content access policy and the content key from the encrypted 3D model; generating, from within the first trusted execution environment, a content key request, wherein the content key request includes the content access policy and the content key; validating, from within a second trusted execution environment of the 3D printing device, the content key request; decrypting, from within the second trusted execution environment, the content access policy using the license key in response to a determination that the content key request is valid; decrypting, from within the second trusted execution environment, the content key using the license key in response to a determination that conditions of the content access policy are satisfied; providing, from within the second trusted execution environment, the decrypted content key to the first trusted execution environment; decrypting, from within the first trusted execution environment, the 3D model content using the decrypted content key; and providing, from within the first trusted execution environment, a sequence of print commands to a printing engine of the 3D printing device based on the decrypted 3D model content.

Example 19 includes the subject matter of Example 18, and wherein decrypting the content access policy using the license key comprises decrypting the content access policy using the license key protected by the second trusted execution environment.

Example 20 includes the subject matter of any of Examples 18 and 19, and further including initializing the first trusted execution environment and the second trusted execution environment in response to receipt of the encrypted 3D model, wherein initializing the first trusted execution environment comprises loading a secure enclave using the trusted execution environment support of a processor of the 3D printing device.

Example 21 includes the subject matter of any of Examples 18-20, and further including creating, from within the first trusted execution environment, a proof of trust of the first trusted execution environment; and receiving, by the second trusted execution environment the proof of trust of the first trusted execution environment; and verifying, from within the second trusted execution environment, the proof of trust prior to the decryption of the content access policy.

Example 22 includes the subject matter of any of Examples 18-21, and further including establishing, by a manageability engine of the 3D printing device, the second trusted execution environment.

Example 23 includes the subject matter of any of Examples 18-22, and further including establishing, by a secure enclave of the 3D printing device, the first trusted execution environment; and establishing, by a manageability engine of the 3D printing device, the second trusted execution environment.

Example 24 includes the subject matter of any of Examples 18-23, and wherein decrypting the content access policy using the license key comprises determining whether one or more conditions that must be satisfied prior to the decryption of the content key are satisfied and decrypting the content access policy using the license key in response to a determination that the one or more are satisfied.

Example 25 includes the subject matter of any of Examples 18-24, and further including extracting, from within the first trusted execution environment, content access policy signatures from the content access policy; generating, from within the first trusted execution environment, a content key request that includes the content access policy, the content key, and the content access policy signatures; and decrypting, from within the second trusted execution environment, the content key using the license key in response to a determination that the content access policy signatures are valid and the conditions of the content access policy are satisfied.

Example 26 includes the subject matter of any of Examples 18-25, and wherein receiving the encrypted 3D model comprises receiving the encrypted 3D model from a 3D model storage server communicatively coupled to the 3D printing device.

Example 27 includes the subject matter of any of Examples 18-26, and further including communicating, from within the second trusted execution environment, with a rights management server communicatively coupled to the 3D printing device, and wherein decrypting the content key using the license key in response to a determination that conditions of the content access policy are satisfied comprises transmitting the content access policy to the rights management server; receiving an authorization notification from the rights management server that indicates whether the conditions of the content access policy are satisfied; and decrypting the content key using the license key in response to an indication of the authorization notification that the conditions of the content access policy are satisfied.

Example 28 includes the subject matter of any of Examples 18-27, and further including receiving, from within the second trusted execution environment, a notification that the print of the encrypted 3D model is completed from the from the first trusted execution environment; and transmitting, from within the second trusted execution environment, a notification of print completion to the rights management server.

Example 29 includes the subject matter of any of Examples 18-28, and further including providing, from within the second trusted execution environment, a notification to the first trusted execution environment in response to an indication of the authorization notification that the conditions of the content access policy are not satisfied; and providing, from within the first trusted execution environment, the notification to a user of the 3D printing device, wherein the notification indicates the content key was not decrypted.

Example 30 includes the subject matter of any of Examples 18-29, and further including receiving, from within the second trusted execution environment, a notification for a user of the 3D printing device to purchase a license for the 3D model in response to a determination that the conditions of the content access policy are not satisfied; providing, from within the second trusted execution environment, the notification to the first trusted execution environment; and providing, from within the first trusted execution environment, the notification to the user of the 3D printing device.

Example 31 includes a method for authorizing a print request from a 3D printing device at a rights management server, wherein the method comprises receiving, by the rights management server, a content access policy of a 3D model from the 3D printing device, wherein the content access policy defines one or more conditions required to authorize the print request; verifying the one or more conditions of the content access policy required to authorize the print request; determining an authorization indication based on the verification of the one or more conditions of the content access policy required to authorize the print request; and transmitting an authorization indication to the 3D printing device.

Example 32 includes the subject matter of Example 31, and further comprising verifying one or more conditions of a license required to authorize the print request, wherein determining the authorization indication is further based on the verification of the one or more conditions of the license.

Example 33 includes the subject matter of any of Examples 31 and 32, and wherein verifying the one or more conditions of the license comprises determining whether a number of allowable copies would be exceeded by an authorization of the print request.

Example 34 includes the subject matter of any of Examples 31-33, and further including facilitating financial operations required to increase the number of allowable copies in response to a determination that the number of allowable copies would be exceeded by an authorization of the print request.

Example 35 includes a 3D printing device comprising a processor; and a memory having stored therein a plurality of instructions that when executed by the processor cause the 3D printing device to perform the method of any of Examples 18-30.

Example 36 includes one or more machine readable storage media comprising a plurality of instructions stored thereon that in response to being executed result in a 3D printing device performing the method of any of Examples 18-30.

Example 37 includes a computing device comprising a processor; and a memory having stored therein a plurality of instructions that when executed by the processor cause the computing device to perform the method of any of Examples 31-34.

Example 38 includes one or more machine readable storage media comprising a plurality of instructions stored thereon that in response to being executed result in a computing device performing the method of any of Examples 31-34.

Example 39 includes a 3D printing device for printing an encrypted 3D model, the 3D printing device comprising means for receiving the encrypted 3D model, wherein the encrypted 3D model includes 3D model content, a content access policy, and a content key, wherein the 3D model content is encrypted by the content key and wherein each of the content access policy and the content key is encrypted by a license key; means for extracting, from within a first trusted execution environment of the 3D printing device, the content access policy and the content key from the encrypted 3D model; means for generating, from within the first trusted execution environment, a content key request, wherein the content key request includes the content access policy and the content key; means for validating, from within a second trusted execution environment of the 3D printing device, the content key request; means for decrypting, from within the second trusted execution environment, the content access policy using the license key in response to a determination that the content key request is valid; means for decrypting, from within the second trusted execution environment, the content key using the license key in response to a determination that conditions of the content access policy are satisfied; means for providing, from within the second trusted execution environment, the decrypted content key to the first trusted execution environment; means for decrypting, from within the first trusted execution environment, the 3D model content using the decrypted content key; and means for providing, from within the first trusted execution environment, a sequence of print commands to a printing engine of the 3D printing device based on the decrypted 3D model content.

Example 40 includes the subject matter of Example 39, and wherein the means for decrypting the content access policy using the license key comprises means for decrypting the content access policy using the license key protected by the second trusted execution environment.

Example 41 includes the subject matter of any of Examples 39 and 40, and further including means for initializing the first trusted execution environment and the second trusted execution environment in response to receipt of the encrypted 3D model, wherein the means for initializing the first trusted execution environment comprises means for unloading a secure enclave using the trusted execution environment support of the processor.

Example 42 includes the subject matter of any of Examples 39-41, and further including means for creating, from within the first trusted execution environment, a proof of trust of the first trusted execution environment; and means for receiving, by the second trusted execution environment the proof of trust of the first trusted execution environment; and means for verifying, from within the second trusted execution environment, the proof of trust prior to the decryption of the content access policy.

Example 43 includes the subject matter of any of Examples 39-42, and further including means for establishing, by a manageability engine of the 3D printing device, the second trusted execution environment.

Example 44 includes the subject matter of any of Examples 39-43, and further including means for establishing, by a secure enclave of the 3D printing device, the first trusted execution environment; and means for establishing, by a manageability engine of the 3D printing device, the second trusted execution environment.

Example 45 includes the subject matter of any of Examples 39-44, and wherein the means for decrypting the content access policy using the license key comprises means for determining whether one or more conditions that must be satisfied prior to the decryption of the content key are satisfied and means for decrypting the content access policy using the license key in response to a determination that the one or more are satisfied.

Example 46 includes the subject matter of any of Examples 39-45, and further including means for extracting, from within the first trusted execution environment, content access policy signatures from the content access policy; means for generating, from within the first trusted execution environment, a content key request that includes the content access policy, the content key, and the content access policy signatures; and means for decrypting, from within the second trusted execution environment, the content key using the license key in response to a determination that the content access policy signatures are valid and the conditions of the content access policy are satisfied.

Example 47 includes the subject matter of any of Examples 39-46, and wherein the means for receiving the encrypted 3D model comprises means for receiving the encrypted 3D model from a 3D model storage server communicatively coupled to the 3D printing device.

Example 48 includes the subject matter of any of Examples 39-47, and further including means for communicating, from within the second trusted execution environment, with a rights management server communicatively coupled to the 3D printing device, and wherein the means for decrypting the content key using the license key in response to a determination that conditions of the content access policy are satisfied comprises means for transmitting the content access policy to the rights management server; means for receiving an authorization notification from the rights management server that indicates whether the conditions of the content access policy are satisfied; and means for decrypting the content key using the license key in response to an indication of the authorization notification that the conditions of the content access policy are satisfied.

Example 49 includes the subject matter of any of Examples 39-48, and further including means for receiving, from within the second trusted execution environment, a notification that the print of the encrypted 3D model is completed from the from the first trusted execution environment; and means for transmitting, from within the second trusted execution environment, a notification of print completion to the rights management server.

Example 50 includes the subject matter of any of Examples 39-49, and further including means for providing, from within the second trusted execution environment, a notification to the first trusted execution environment in response to an indication of the authorization notification that the conditions of the content access policy are not satisfied; and means for providing, from within the first trusted execution environment, the notification to a user of the 3D printing device, wherein the notification indicates the content key was not decrypted.

Example 51 includes the subject matter of any of Examples 39-50, and further including means for receiving, from within the second trusted execution environment, a notification for a user of the 3D printing device to purchase a license for the 3D model in response to a determination that the conditions of the content access policy are not satisfied; means for providing, from within the second trusted execution environment, the notification to the first trusted execution environment; and means for providing, from within the first trusted execution environment, the notification to the user of the 3D printing device.

Example 52 includes a rights management server for authorizing a print request from a 3D printing device, the rights management server comprising means for receiving a content access policy of a 3D model from the 3D printing device, wherein the content access policy defines one or more conditions required to authorize the print request; means for verifying the one or more conditions of the content access policy required to authorize the print request; means for determining an authorization indication based on the verification of the one or more conditions of the content access policy required to authorize the print request; and means for transmitting an authorization indication to the 3D printing device.

Example 53 includes the subject matter of Example 52, and further including means for verifying one or more conditions of a license required to authorize the print request, wherein the means for determining the authorization indication is further based on the verification of the one or more conditions of the license.

Example 54 includes the subject matter of any of Examples 52 and 53, and wherein the means for verifying the one or more conditions of the license comprises means for determining whether a number of allowable copies would be exceeded by an authorization of the print request.

Example 55 includes the subject matter of any of Examples 52-54, and further including means for facilitating financial operations required to increase the number of allowable copies in response to a determination that the number of allowable copies would be exceeded by an authorization of the print request.

The invention claimed is:

1. A 3D printing device for printing an encrypted 3D model, the 3D printing device comprising:
   a network communication circuit to receive the encrypted 3D model, wherein the encrypted 3D model includes 3D model content, a content access policy, and a content key, wherein the 3D model content is encrypted by the content key and wherein each of the content access policy and the content key is encrypted by a license key;
   a processor having trusted execution environment support to establish a first trusted execution environment;
   a security engine, different from the processor, to establish a second trusted execution environment different from the first trusted execution environment;
   a model unlock engine established by the processor in the first trusted execution environment to (i) extract the content access policy and the content key from the encrypted 3D model and (ii) generate a content key request, wherein the content key request includes the content access policy and the content key;
   a key release engine established by the security engine in the second trusted execution environment to (i) validate the content key request, (ii) decrypt the content access policy using the license key in response to a determination that the content key request is valid, (iii) decrypt the content key using the license key in response to a determination that conditions of the content access policy are satisfied, and (iv) provide the decrypted content key to the model unlock engine,
   wherein the model unlock engine is further to decrypt the 3D model content using the decrypted content key and provide a sequence of print commands to a printing engine of the 3D printing device based on the decrypted 3D model content.

2. The 3D printing device of claim 1, wherein:
   the 3D printing device is to initialize the first trusted execution environment and the second trusted execution environment in response to receipt of the encrypted 3D model, and
   wherein to initialize the first trusted execution environment comprises to load a secure enclave using the trusted execution environment support of the processor.

3. The 3D printing device of claim 1, wherein the model unlock engine is further to create a proof of trust of the first trusted execution environment, wherein the key release engine is further to receive the proof of trust of the first trusted execution environment and verify the proof of trust prior to the decryption of the content access policy.

4. The 3D printing device of claim 1, wherein:
the 3D model content further includes content access policy signatures, and
the model unlock engine is to extract the content access policy signatures from the content access policy and generate a content key request that includes the content access policy, the content key, and the content access policy signatures, and
the key release engine is to decrypt the content key using the license key in response to a determination that the content access policy signatures are valid and the conditions of the content access policy are satisfied.

5. The 3D printing device of claim 1, wherein the key release engine is further to communicate with a rights management server communicatively coupled to the 3D printing device, and
wherein to decrypt the content key using the license key in response to a determination that conditions of the content access policy are satisfied comprises to (i) transmit the content access policy to the rights management server, (ii) receive an authorization notification from the rights management server that indicates whether the conditions of the content access policy are satisfied, and (iii) decrypt the content key using the license key in response to an indication of the authorization notification that the conditions of the content access policy are satisfied.

6. The 3D printing device of claim 5, wherein the key release engine is further to receive a notification that the print of the encrypted 3D model is completed from the model unlock engine and transmit a notification of print completion to the rights management server.

7. The 3D printing device of claim 5, wherein the key release engine is not to decrypt the content key in response to an indication of the authorization notification that the conditions of the content access policy are not satisfied.

8. The 3D printing device of claim 5, wherein the key release engine is to receive a notification for a user of the 3D printing device to purchase a license for the 3D model in response to a determination that the conditions of the content access policy are not satisfied.

9. A rights management server for authorizing a print request from a 3D printing device, wherein the rights management server comprises:
a network communication circuit to receive a content access policy of a 3D model, wherein the content access policy defines one or more conditions of the content access policy required to authorize the print request; and
a processor; and
a storage coupled to the processor; and
a content access policy authorization module stored in the storage and executable by the processor to verify the one or more conditions required to authorize the print request and transmit an authorization indication to the 3D printing device based on the verification of the one or more conditions of the content access policy required to authorize the print request.

10. The rights management server of claim 9, further comprising:
a license authorization module, stored in the storage and executable by the processor, to verify one or more conditions of a license required to authorize the print request, wherein to transmit the authorization indication to the 3D printing device is further based on a verification of the one or more conditions of the license required to authorize the print request.

11. The rights management server of claim 10, wherein to verify the one or more conditions of the license comprises to determine whether a number of allowable copies would be exceeded by an authorization of the print request.

12. The rights management server of claim 11, further comprising:
a financial operations module stored in the storage and executable by the processor to facilitate financial operations required to increase the number of allowable copies in response to a determination that the number of allowable copies would be exceeded by an authorization of the print request.

13. One or more non-transitory computer-readable storage media comprising a plurality of instructions stored thereon that in response to being executed cause a 3D printing device to:
receive the encrypted 3D model, wherein the encrypted 3D model includes 3D model content, a content access policy, and a content key, wherein the 3D model content is encrypted by the content key and wherein each of the content access policy and the content key is encrypted by a license key;
extract, from within a first trusted execution environment of the 3D printing device, the content access policy and the content key from the encrypted 3D model;
generate, from within the first trusted execution environment, a content key request, wherein the content key request includes the content access policy and the content key;
validate, from within a second trusted execution environment of the 3D printing device, the content key request;
decrypt, from within the second trusted execution environment, the content access policy using the license key in response to a determination that the content key request is valid;
decrypt, from within the second trusted execution environment, the content key using the license key in response to a determination that conditions of the content access policy are satisfied;
provide, from within the second trusted execution environment, the decrypted content key to the first trusted execution environment;
decrypt, from within the first trusted execution environment, the 3D model content using the decrypted content key; and
provide, from within the first trusted execution environment, a sequence of print commands to a printing engine of the 3D printing device based on the decrypted 3D model content.

14. The one or more non-transitory computer-readable storage media of claim 13, wherein to decrypt the content access policy using the license key comprises to decrypt the content access policy using the license key protected by the second trusted execution environment.

15. The one or more non-transitory computer-readable storage media of claim 13, further comprising a plurality of instructions that in response to being executed cause the 3D computing device to:
initialize the first trusted execution environment and the second trusted execution environment in response to receipt of the encrypted 3D model, wherein to initialize the first trusted execution environment comprises to load a secure enclave using the trusted execution environment support of a processor of the 3D printing device.

16. The one or more non-transitory computer-readable storage media of claim 13, further comprising a plurality of instructions that in response to being executed cause the 3D computing device to:
  create, from within the first trusted execution environment, a proof of trust of the first trusted execution environment; and
  receive, by the second trusted execution environment the proof of trust of the first trusted execution environment; and
  verify, from within the second trusted execution environment, the proof of trust prior to the decryption of the content access policy.

17. The one or more non-transitory computer-readable storage media of claim 13, further comprising a plurality of instructions that in response to being executed cause the 3D computing device to:
  establish, by a secure enclave of the 3D printing device, the first trusted execution environment; and
  establish, by a manageability engine of the 3D printing device, the second trusted execution environment.

18. The one or more non-transitory computer-readable storage media of claim 13, further comprising a plurality of instructions that in response to being executed cause the 3D computing device to:
  extract, from within the first trusted execution environment, content access policy signatures from the content access policy;
  generate, from within the first trusted execution environment, a content key request that includes the content access policy, the content key, and the content access policy signatures; and
  decrypt, from within the second trusted execution environment, the content key using the license key in response to a determination that the content access policy signatures are valid and the conditions of the content access policy are satisfied.

19. The one or more non-transitory computer-readable storage media of claim 13, further comprising a plurality of instructions that in response to being executed cause the 3D computing device to:
  communicate, from within the second trusted execution environment, with a rights management server communicatively coupled to the 3D printing device, and
  wherein to decrypt the content key using the license key in response to a determination that conditions of the content access policy are satisfied comprises:
    transmit the content access policy to the rights management server;
    receive an authorization notification from the rights management server that indicates whether the conditions of the content access policy are satisfied; and
    decrypt the content key using the license key in response to an indication of the authorization notification that the conditions of the content access policy are satisfied.

20. The one or more non-transitory computer-readable storage media of claim 19, further comprising a plurality of instructions that in response to being executed cause the 3D computing device to:
  receive, from within the second trusted execution environment, a notification that the print of the encrypted 3D model is completed from the from the first trusted execution environment; and
  transmit, from within the second trusted execution environment, a notification of print completion to the rights management server.

21. The one or more non-transitory computer-readable storage media of claim 19, further comprising a plurality of instructions that in response to being executed cause the 3D computing device to:
  provide, from within the second trusted execution environment, a notification to the first trusted execution environment in response to an indication of the authorization notification that the conditions of the content access policy are not satisfied; and
  provide, from within the first trusted execution environment, the notification to a user of the 3D printing device, wherein the notification indicates the content key was not decrypted.

22. The one or more non-transitory computer-readable storage media of claim 19, further comprising:
  receive, from within the second trusted execution environment, a notification for a user of the 3D printing device to purchase a license for the 3D model in response to a determination that the conditions of the content access policy are not satisfied;
  provide, from within the second trusted execution environment, the notification to the first trusted execution environment; and
  provide, from within the first trusted execution environment, the notification to the user of the 3D printing device.

23. One or more non-transitory computer-readable storage media comprising a plurality of instructions stored thereon that in response to being executed cause a computing device to:
  receive, by the rights management server, a content access policy of a 3D model from the 3D printing device, wherein the content access policy defines one or more conditions required to authorize the print request;
  verify the one or more conditions of the content access policy required to authorize the print request;
  determine an authorization indication based on the verification of the one or more conditions of the content access policy required to authorize the print request; and
  transmit an authorization indication to the 3D printing device.

24. The one or more non-transitory computer-readable storage media of claim 23, further comprising a plurality of instructions that in response to being executed cause the computing device to:
  verify one or more conditions of a license required to authorize the print request,
  wherein to determine the authorization indication is further based on the verification of the one or more conditions of the license.

* * * * *